(12) United States Patent
Krishnan et al.

(10) Patent No.: US 12,032,459 B2
(45) Date of Patent: Jul. 9, 2024

(54) MEDIATOR ASSISTED SWITCHOVER BETWEEN CLUSTERS

(71) Applicant: NetApp, Inc., San Jose, CA (US)

(72) Inventors: Sasidharan Krishnan, Fremont, CA (US); Kalaivani Arumugham, Sunnyvale, CA (US); Preksha Bansal, San Jose, CA (US); Vijay Kumar Chakravarthy Ekkaladevi, Dublin, CA (US); Ryan Edward Bartlett, Harmony, PA (US)

(73) Assignee: NetApp, Inc., San Jose, CA (US)

( * ) Notice: Subject to any disclaimer, the term of this patent is extended or adjusted under 35 U.S.C. 154(b) by 145 days.

(21) Appl. No.: 17/748,277

(22) Filed: May 19, 2022

(65) Prior Publication Data

US 2022/0292004 A1     Sep. 15, 2022

Related U.S. Application Data

(63) Continuation-in-part of application No. 17/160,706, filed on Jan. 28, 2021, now Pat. No. 11,487,635.

(60) Provisional application No. 63/116,577, filed on Nov. 20, 2020.

(51) Int. Cl.
    *G06F 11/20* (2006.01)
    *G06F 11/14* (2006.01)
    *G06F 11/16* (2006.01)

(52) U.S. Cl.
    CPC ...... *G06F 11/2033* (2013.01); *G06F 11/1435* (2013.01); *G06F 11/1658* (2013.01); *G06F 11/2028* (2013.01); *G06F 11/203* (2013.01)

(58) Field of Classification Search
    CPC ............. G06F 11/142; G06F 11/1425; G06F 11/2025; G06F 11/2028; G06F 11/2076; G06F 11/2046; G06F 11/2035; G06F 11/2023
    See application file for complete search history.

(56) References Cited

U.S. PATENT DOCUMENTS

| 6,279,032 B1 | 8/2001 | Short et al. |
| 8,108,715 B1 | 1/2012 | Agarwal |
| 8,578,204 B1 | 11/2013 | Ortenberg et al. |

(Continued)

OTHER PUBLICATIONS

"Oracle Active Data Guard Real-Time Data Protection and Availability", Oracle, pp. 1-22 (Year: 2015).*

(Continued)

*Primary Examiner* — Gabriel Chu

(74) *Attorney, Agent, or Firm* — Jaffery Watson Mendonsa & Hamilton LLP

(57) ABSTRACT

Techniques are provided for metadata management for enabling automated switchover in accordance with a configuration of storage solution that expresses a preference for either maintaining availability (e.g., a non-zero RPO mode) of the storage solution or avoiding data loss (e.g., a zero RPO mode). In one example, responsive to detecting a switchover trigger event, a node of a local cluster of a cross-site storage solution determines whether performance of an automated switchover from a failed cluster to a surviving cluster of the cross-site storage solution is enabled. Responsive to an affirmative determination, the node selectively proceeds with the automated switchover based on the configuration.

20 Claims, 9 Drawing Sheets

(56) References Cited

U.S. PATENT DOCUMENTS

| | | |
|---|---|---|
| 9,298,728 B2 * | 3/2016 | McAlister ........... G06F 11/3006 |
| 9,361,194 B2 | 6/2016 | Long et al. |
| 10,169,097 B2 | 1/2019 | Nishanov et al. |
| 10,216,450 B2 | 2/2019 | Long et al. |
| 10,346,063 B2 | 7/2019 | Zhang et al. |
| 10,592,342 B1 | 3/2020 | Sokolova et al. |
| 10,826,812 B2 | 11/2020 | Casacio et al. |
| 10,852,984 B2 | 12/2020 | Long et al. |
| 11,487,635 B2 | 11/2022 | Krishnan et al. |
| 2001/0039630 A1 | 11/2001 | Kursawe et al. |
| 2007/0124348 A1 * | 5/2007 | Claborn .............. G06F 11/2025 |
| 2007/0168704 A1 * | 7/2007 | Connolly ............ G06F 11/2025 |
| | | 714/E11.073 |
| 2007/0198700 A1 * | 8/2007 | Vivian ................ G06F 11/2097 |
| | | 709/224 |
| 2008/0184061 A1 | 7/2008 | Tripathi et al. |
| 2009/0049329 A1 * | 2/2009 | Lind ................... G06F 11/2097 |
| | | 714/2 |
| 2011/0252270 A1 | 10/2011 | Abraham et al. |
| 2017/0010943 A1 | 1/2017 | Endo |
| 2018/0143887 A1 | 5/2018 | Zhang |
| 2018/0219946 A1 | 8/2018 | Farrahi Moghaddam et al. |
| 2018/0268011 A1 | 9/2018 | Cao et al. |
| 2023/0053316 A1 | 2/2023 | Krishnan et al. |

OTHER PUBLICATIONS

Notice of Allowance mailed on Jun. 23, 2022 for U.S. Appl. No. 17/160,706, filed Jan. 28, 2021, 9 pages.

* cited by examiner

| Event | State | F == 0 | F == N/2 | F > N/2 | F == N |
|---|---|---|---|---|---|
| Local Mailbox Write  602 | Normal | Panics | If N == 3: If AUSO was disabled, stay online. Otherwise halt node (See Note 1)  If N == 2, AUSO is not possible, stay online  If vote(M) is 0, disable AUSO  Failed disks removed from Mbx set  Note: If a node loses both L and R mailboxes affecting root access, it may independently panic. | Write succeeds  Failed disks removed from Mbx set  If vote(M) is 0, disable AUSO | Write succeeds  Failed disks removed from Mbx set |
| Local Mailbox Read  604 | Normal | Read fails | If hints match, Read succeeds, else Read fails | Read succeeds | Read succeeds |
| Partner Mailbox Read  606 | Normal | Read fails | Read fails | Read fails | Read succeeds if there are no disk I/O failure on L or R disks, else Read fails |
| Partner Mailbox Write  608 | Normal | Panics | If N == 3: If AUSO was disabled, stay online. Otherwise halt node (See Note 1 and Note 2)  If N == 2, AUSO is not possible, stay online  If vote(M) is 0, disable AUSO | Write succeeds  If vote(M) is 0, disable AUSO | Write succeeds |
| DR partner Mailbox Read  610 | Normal | Read fails | Read fails | Read succeeds | Read succeeds |
| DR partner Mailbox Write | Normal | N/A | N/A | N/A | N/A |
| Local Mailbox Write  612 | Switchover | Panic | Write succeeds  Failed disks removed from Mbx set | Write succeeds  Failed disks removed from Mbx set | Write succeeds  Failed disks removed from Mbx set |
| Local Mailbox Read  614 | Switchover | Read fails | If hints match, Read succeeds, else Read fails | Read succeeds | Read succeeds |
| Partner Mailbox Read  616 | Switchover | Read fails | Read fails | Read fails | Read succeeds if there are no disk I/O failure on L or R disks, else Read fails |
| DR partner Mailbox read  618 | Switchover | Read fails | Read fails | Read succeeds | Read succeeds |

FIG. 6

MEDIATOR ASSISTED SWITCHOVER BETWEEN CLUSTERS

RELATED APPLICATIONS

This application is a continuation-in-part of U.S. patent application Ser. No. 17/160,706, filed Feb. 5, 2021, which claims priority to U.S. Provisional Application No. 63/116,577, filed Nov. 20, 2020, both of which are hereby incorporated by reference in their entirety for all purposes.

BACKGROUND

A storage environment may provide client devices with high availability (HA) and/or disaster recovery (DR) functionality for client data maintained by the storage environment. For example, a first node and a second node at a first cluster may be configured according to a first node pairing. If one of the nodes fails, then the surviving node performs a local failover to take over for the failed node at the first cluster. A third node and a fourth node at a second cluster may be configured according to a second node pairing. If one of the nodes fails, then the surviving node performs a local failover to take over for the failed node at the second cluster. In this way, node pairings may provide local failover so that a surviving node may process client operations in place of the failed node. Because the nodes of a node pairing may be within the same cluster (e.g., locally attached to one another), the local failover may be relatively fast, thus reducing client downtime. Once the failed node recovers as a recovered node, a giveback may be performed from the surviving node to the recovered node so that the recovered node can resume processing client operations.

The first cluster and the second cluster may be configured according to a DR relationship. If one of the clusters experiences a disaster, then a surviving cluster performs a switchover to take over for the failed cluster. For example, if the first cluster fails, then the third node and the fourth node of the second cluster may take over the processing of client operations in place of the failed first node and the failed second node. Once the first cluster recovers, a switchback may be performed from the second cluster to the first cluster so that the first node and the second node of the first cluster can resume processing client operations.

DESCRIPTION OF THE DRAWINGS

FIG. 6 is a chart illustrating an example of actions performed based upon quorum voting.

DETAILED DESCRIPTION

Figure 1:
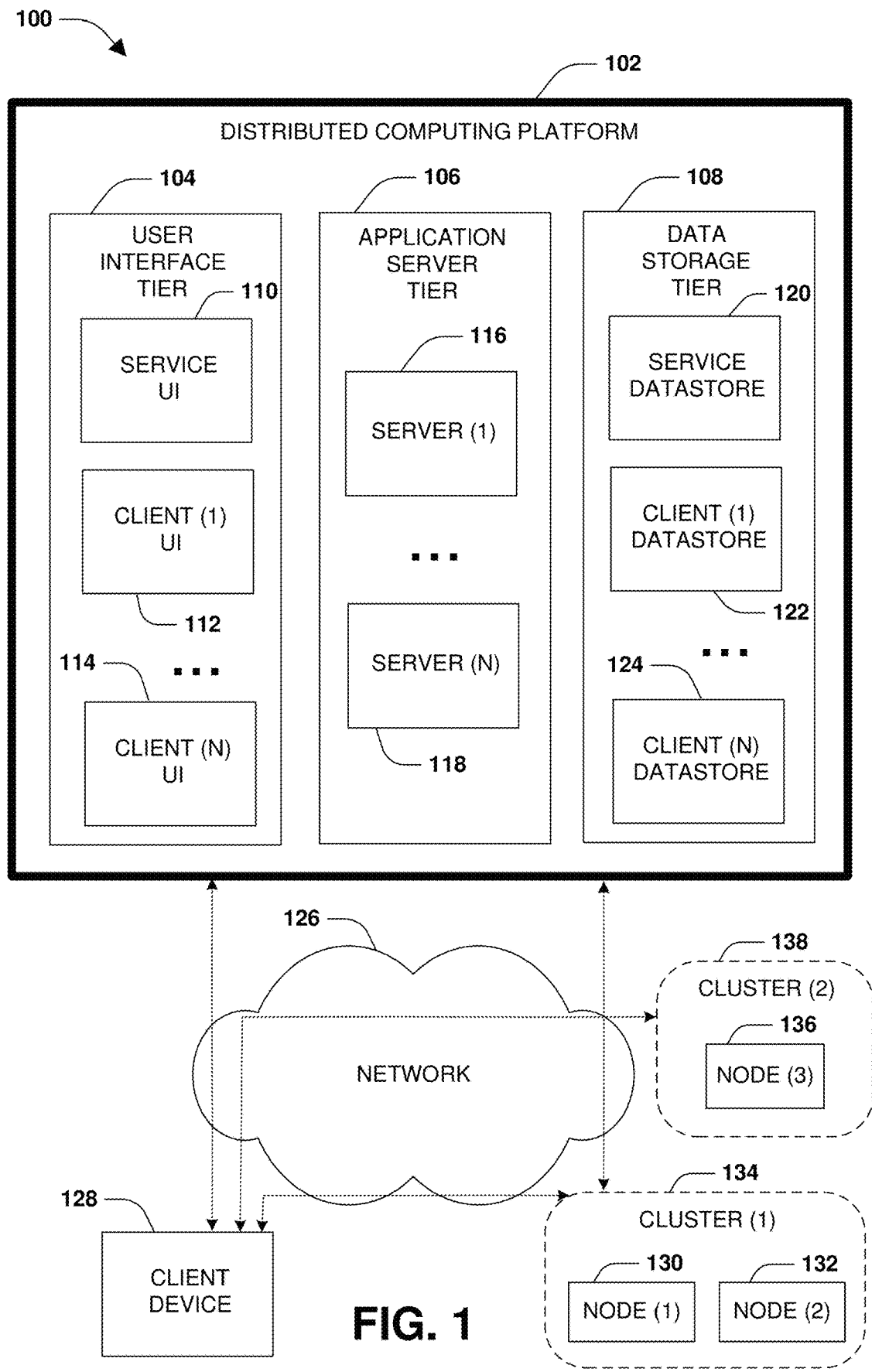
FIG. 1 is a block diagram illustrating an example computing environment in which an embodiment of the invention may be implemented.

The techniques described herein are directed to mediator assisted switchover between clusters. A computing environment may comprise two nodes that are paired together at a first cluster according to an HA pairing such that if one node fails then the surviving node can take over for the failed node. Similarly, two nodes may be paired together at a second cluster according to the HA pairing. If an entire cluster fails, then a switchover operation may be performed such that the surviving cluster takes over for the failed cluster. Various metadata may be exchanged and shared amongst the nodes in order to correctly and efficiently perform the switchover. In particular, nodes may share operational information, such as heartbeat information, to indicate whether such nodes are operational or have failed and thus a switchover should be performed. Also, the nodes may share switchover information indicating whether automated switchover (AUSO) is enabled and possible or disabled because automated switchover cannot be safely performed, for example, because a mediator node is unavailable. Without up-to-date metadata, the first cluster may erroneously perform a switchover to take over for the second cluster based upon the first cluster mistakenly assuming the second cluster has failed, but merely a communication failure between the two clusters has occurred and the second cluster is actually still actively processing client I/O operations.

Some HA solutions may focus on achieving zero or near zero recovery point objective (RPO) recovery (e.g., zero data loss from a failure) and may therefore avoid performing AUSO when there is a potential for data loss. For example, when the first and second clusters represent distributed storage systems of a storage solution, the switchover information may indicate whether the mirroring/synchronization between respective nodes of the clusters is up to date (or more specifically, as described further below, respective non-volatile random access memories (NVRAMs) are in-sync or the operation logs maintained therein are is a state of synchronization). When the mirroring/synchronization is not up to date, data loss will occur as a result of the switchover to the surviving cluster because some operations performed at the failed cluster and/or some data stored at the failed cluster has not yet been replicated to the surviving cluster. In such a situation, an HA solution focused on achieving zero RPO may preclude AUSO from the failed cluster to the surviving cluster, thereby making the storage solution unavailable.

In various usage scenarios, some users may rather tradeoff data loss in exchange for maintaining availability of the storage solution. Accordingly, as provided herein, a user of the storage solution may express their preference between maintaining availability of the storage solution and avoiding data loss by configuring the storage solution to operate in a non-zero RPO mode vs. a zero RPO mode, respectively. When operating in the non-zero RPO mode, AUSO may be performed when AUSO is enabled and regardless of whether data loss is expected to occur as a result of the switchover, whereas when operating in the zero RPO mode, AUSO may be performed when AUSO is enabled and no data loss is expected to occur as a result of the switchover. Furthermore, each node may store metadata within local mailbox storage devices, remote mailbox storage devices, and a mediator storage device, which may be owned by the node and located at the local cluster where a node is located, at a remote cluster, and at a mediator node. When a node performs a read operation or a write operation associated with metadata and the mailbox storage devices, quorum voting is performed in order to determine whether the operation is successful, should be considered as failed, and/or whether additional actions should be taken (e.g., enable or disable automated switchover, panic and terminate execution, remove a mailbox storage device, etc.). In particular, an initial quorum vote is performed before the operation is executed and a final quorum vote is performed after the operation is executed. The initial quorum vote and the final quorum vote are compared to determine whether the operation is successful, should be considered as failed, and/or whether any additional actions should be taken. A quorum vote may correspond to whether at least one local mailbox storage device, at least one remote storage device, and/or the mediator storage device are operational.

This technique for metadata management and mediator assisted switchover enables the ability to safely/correctly (as opposed to mistakenly performing a switchover when the switchover should not be performed) and efficiently perform automated switchover in a manner that is consistent with the user's expressed preference regarding their tradeoffs between storage solution availability and data loss. In this way, clients of a storage solution configured to operate in the zero RPO mode will lose zero or near-zero client data in the event of a cluster failure/disaster because the surviving cluster can perform automated switchover in a manner where the client data (e.g., client data previously accessible to clients through the failed cluster) is not lost and is accessible to clients through the surviving cluster. Meanwhile, clients of a storage solution configured to operate in the non-zero RPO mode may lose some data, but will maintain their access to the storage solution in the event of a cluster failure/disaster because the surviving cluster can perform automated switchover even when loss of data cannot be ensured.

Mediator assisted switchover utilizing a mediator node for storing and sharing metadata amongst nodes enables disaster recovery over an Internet Protocol (IP) network. That is, the first cluster and the second cluster may be connected over the IP network. In order to efficiently and correctly perform a switchover as part of disaster recovery across the IP network between the clusters, the mediator node may additionally be utilized for storing and sharing metadata amongst nodes.

Example Operating Environment

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc., which may be part of an on-premise, cloud-based, or hybrid storage solution.

A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage.

The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In some embodiments, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices.

A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In some embodiments, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

Deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device.

Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an embodiment of background deduplication, data blocks that are duplicated between files are rearranged within storage units such that one copy of the data occupies physical storage. References to the single copy can be inserted into a file system structure such that all files or containers that contain the data refer to the same instance of the data.

Deduplication can be performed on a data storage device block basis. In an embodiment, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, and the like. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number.

For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file.

The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In some embodiments, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132.

In the LRSE protocol, the second node 132 maintains a history buffer that keeps track of data blocks that the second node 132 has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an embodiment, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an embodiment, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an embodiment, various types of synchronization may be implemented by a synchronization module associated with the storage operating system. In an embodiment, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an embodiment, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an embodiment, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an embodiment, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108. The storage solution may also be configurable by a user via the user interface tier 104 to operate in a non-zero RPO mode or a zero RPO mode with respect to performance of AUSO.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Example Clustered Network Environment

Figure 2:
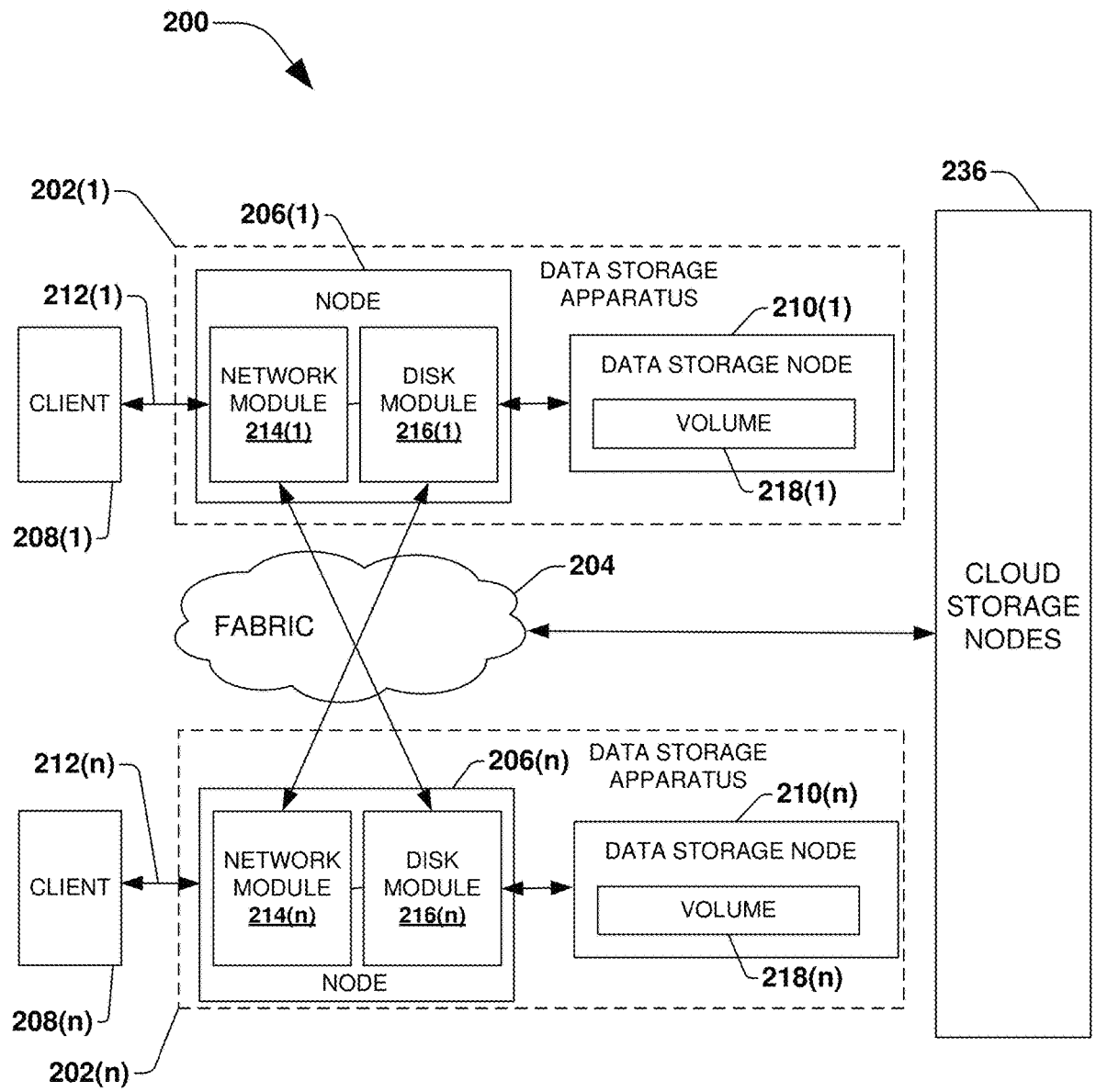
FIG. 2 is a block diagram illustrating an example of a network environment with exemplary nodes in accordance with an embodiment of the invention.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, nodes 206(1)-206(n), for example), although any number of other elements or components can also be included in the clustered network environment 200 in other examples. This technology provides a number of advantages including methods, non-transitory computer readable media, and computing devices that implement the techniques described herein.

In this example, nodes 206(1)-206(n) can be primary or local storage controllers or secondary or remote storage controllers that provide client devices 208(1)-208(n) with access to data stored within data storage devices 210(1)-210(n) and cloud storage device(s) 236 (also referred to as cloud storage node(s)). The nodes 206(1)-206(n) may be implemented as hardware, software (e.g., a storage virtual machine), or combination thereof.

The data storage apparatuses 202(1)-202(n) and/or nodes 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The nodes 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such nodes 206(1)-206(n) can be attached to the cluster fabric 204 at a connection point, redistribution point, or communication endpoint, for example. One or more of the nodes 206(1)-206(n) may be capable of sending, receiving, and/or forwarding information over a network communications channel, and could comprise any type of device that meets any or all of these criteria.

In an embodiment, the nodes 206(1) and 206(n) may be configured according to a disaster recovery configuration whereby a surviving node provides switchover access to the data storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the nodes 206(1)-206(n) can be configured based on another type of replication arrangement (e.g., to facilitate load sharing). Additionally, while two nodes are illustrated in FIG. 2, any number of nodes or data storage apparatuses can be included in other examples in other types of configurations or arrangements.

As illustrated in the clustered network environment 200, nodes 206(1)-206(n) can include various functional components that coordinate to provide a distributed storage architecture. For example, the nodes 206(1)-206(n) can include network modules 214(1)-214(n) and disk modules 216(1)-216(n). Network modules 214(1)-214(n) can be configured to allow the nodes 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the nodes 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on nodes 206(1)-206(n), the data storage devices 210(1)-210(n) can appear as locally attached. In this manner, different nodes 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different nodes can have a different number of network and disk modules, and the same node computing device can have a different number of network modules than disk modules.

Further, one or more of the client devices 208(1)-208(n) can be networked with the nodes 206(1)-206(n) in the cluster, over the storage connections 212(1)-212(n). As an example, respective client devices 208(1)-208(n) that are networked to a cluster may request services (e.g., exchanging of information in the form of data packets) of nodes 206(1)-206(n) in the cluster, and the nodes 206(1)-206(n) can return results of the requested services to the client devices 208(1)-208(n). In one example, the client devices 208(1)-208(n) can exchange information with the network modules 214(1)-214(n) residing in the nodes 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example, volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the nodes 206(1)-206(n) connects to a volume, a connection between the one of the nodes 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Example Node Computing Device

Figure 3:
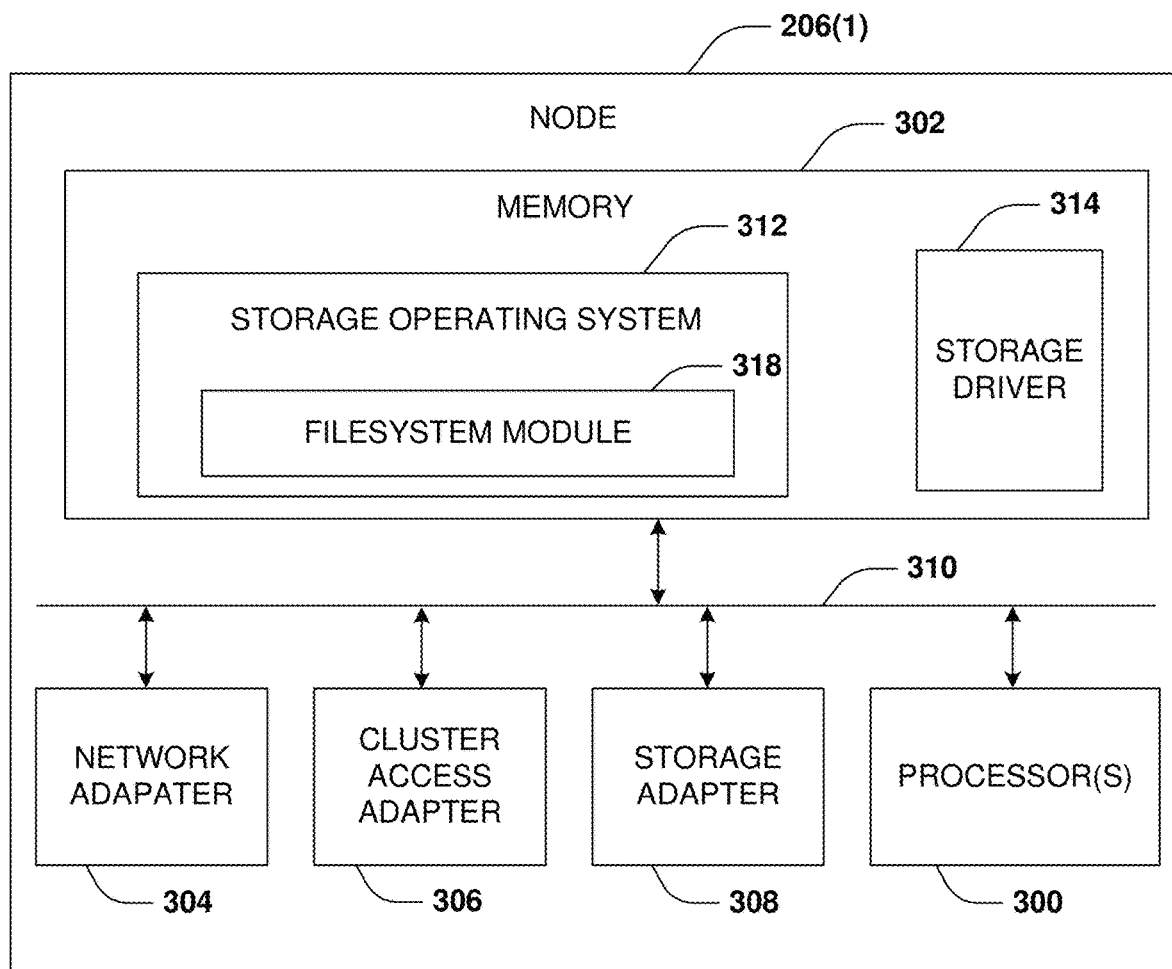
FIG. 3 is a block diagram illustrating an example of various components that may be present within a node that may be used in accordance with an embodiment of the invention.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1).

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(2) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Example Mediator Assisted Switchover

Figure 4:
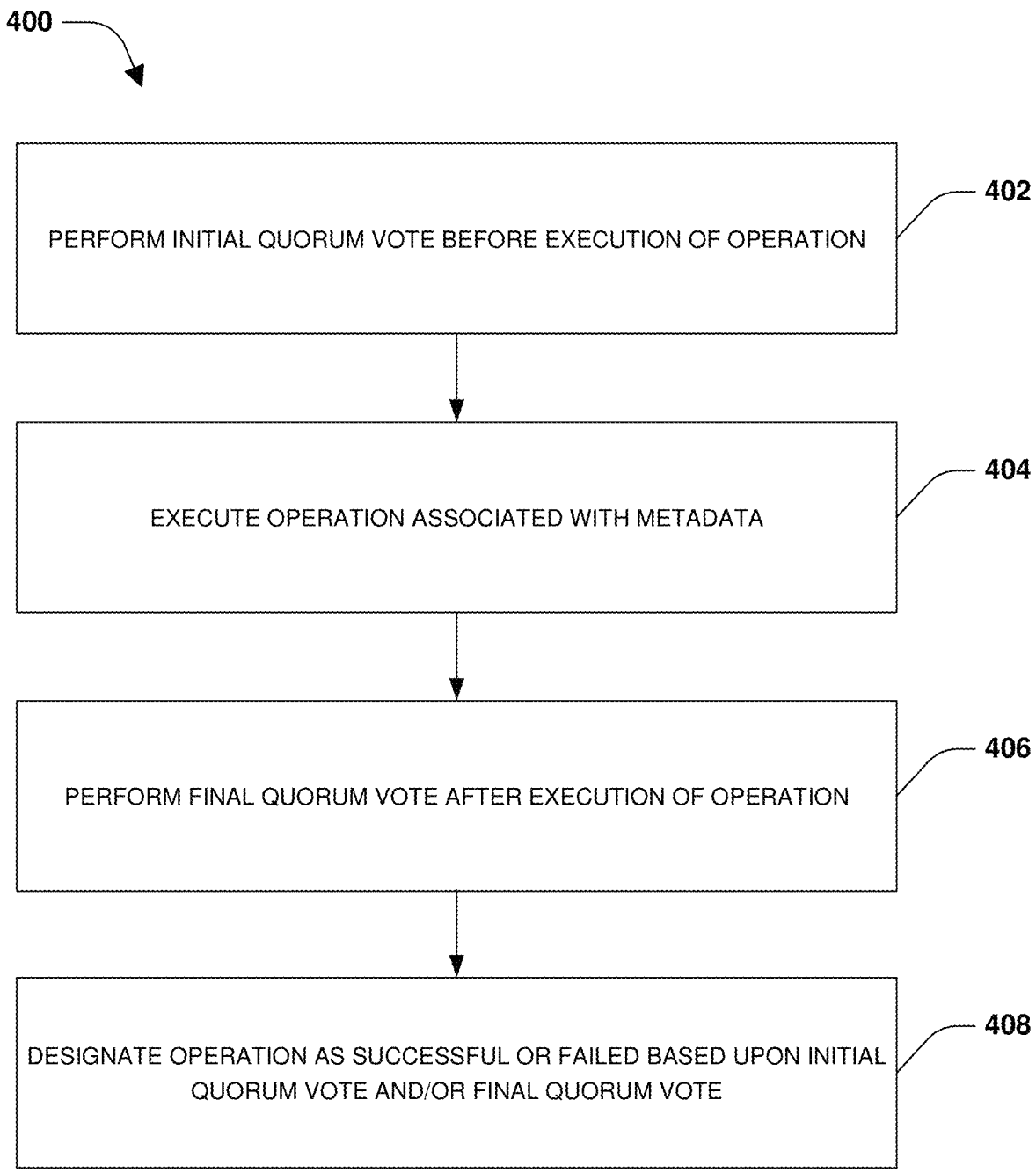
FIG. 4 is a flow chart illustrating an example of mediator assisted switchover between clusters.
Figure 5:
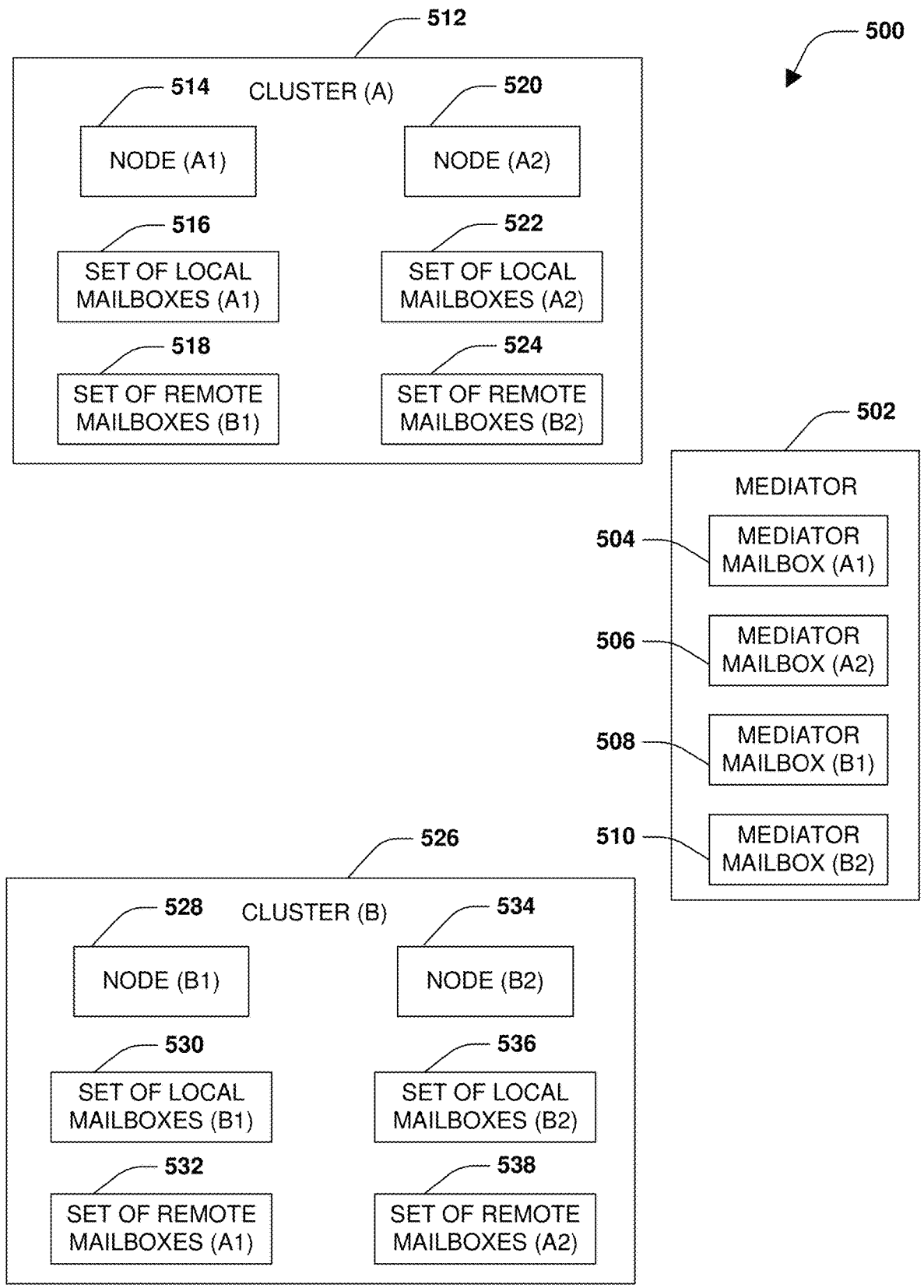
FIG. 5 is a block diagram illustrating an example of mediator assisted switchover between clusters.

One embodiment of metadata management for enabling mediator assisted switchover is illustrated by an exemplary method 400 of FIG. 4, which is further described in conjunction with system 500 of FIG. 5. A cluster (A) 512 may host a node (A1) 514 and a node (A2) 520. The node (A1) 514 and the node (A2) 520 may be configured as a high availability pairing such that if one node fails, then the surviving node can quickly perform a takeover for the failed node in order to process client I/O operations to client data previously accessed by client devices through the failed node. A cluster (B) 526 may host a node (B1) 528 and a node (B2) 534. The node (B1) 528 and the node (B2) 534 may be configured as a high availability pairing such that if one node fails, then the surviving node can quickly perform a takeover for the failed node in order to process client I/O operations to client data previously accessed by client devices through the failed node.

The cluster (A) 512 and the cluster (B) 526 may be configured according to a disaster recovery relationship. If one cluster fails, then nodes of the surviving cluster may perform an automated switchover to take over for the failed cluster for providing client devices with access to client data previously accessible to the client devices through the failed cluster. In an embodiment, the node (A1) 514 and the node (B1) 528 may be disaster recovery (DR) partners such that if a cluster where one of the nodes is hosted fails, then the surviving partner node will perform the automated switchover to process client I/O operations in place of the node at the failed cluster.

In order to safely and efficiently enable automated switchover (AUSO), such as a switchover desired to achieve zero RPO recovery (e.g., the storage solution is configured to operate in zero RPO mode) or a switchover in which non-zero RPO recovery is acceptable in exchange for maintaining availability of the storage solution (e.g., the storage solution is configured to operate in non-zero RPO mode), metadata may be shared amongst the nodes. The metadata may comprise various information relating to operation/health of nodes, whether automated switchover is possible, enabled, or disabled, etc. In an embodiment, the metadata may comprise operational state information of a node (e.g., a heartbeat). For example, the node may periodically update heartbeat values in a mailbox storage device, such as a mailbox storage device that can be read by a disaster recovery partner (e.g., the node (B2) 534 may read heartbeat information stored by the node (A2) 520 within a mailbox storage device owned by the node (A2) 520, which may be located at the cluster (B) 526 such as within the set of remote mailboxes (A2) 538).

Figure 7:
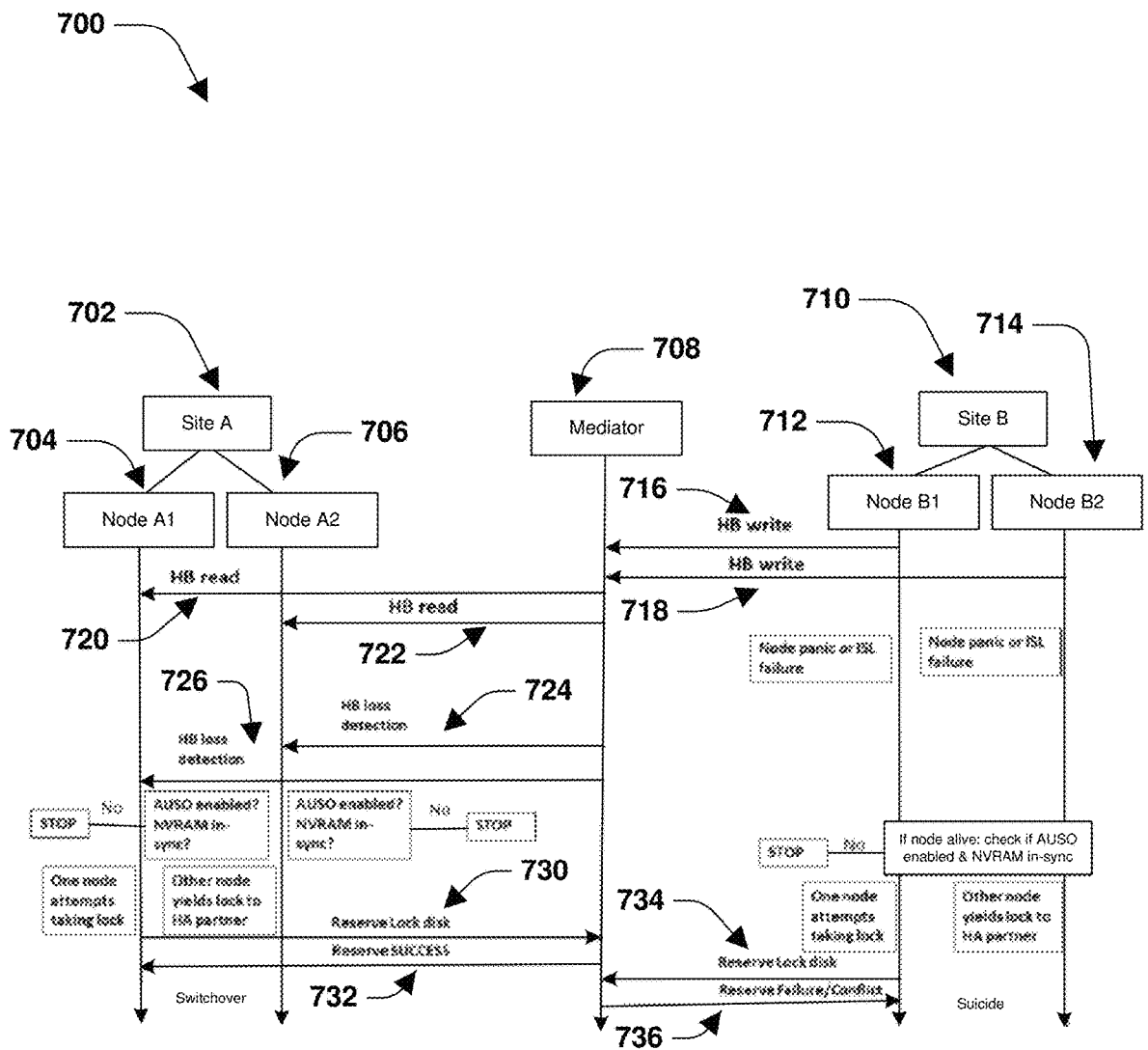
FIG. 7 is a flow chart illustrating an example of a switchover between clusters in a first mode of operation.
Figure 8:
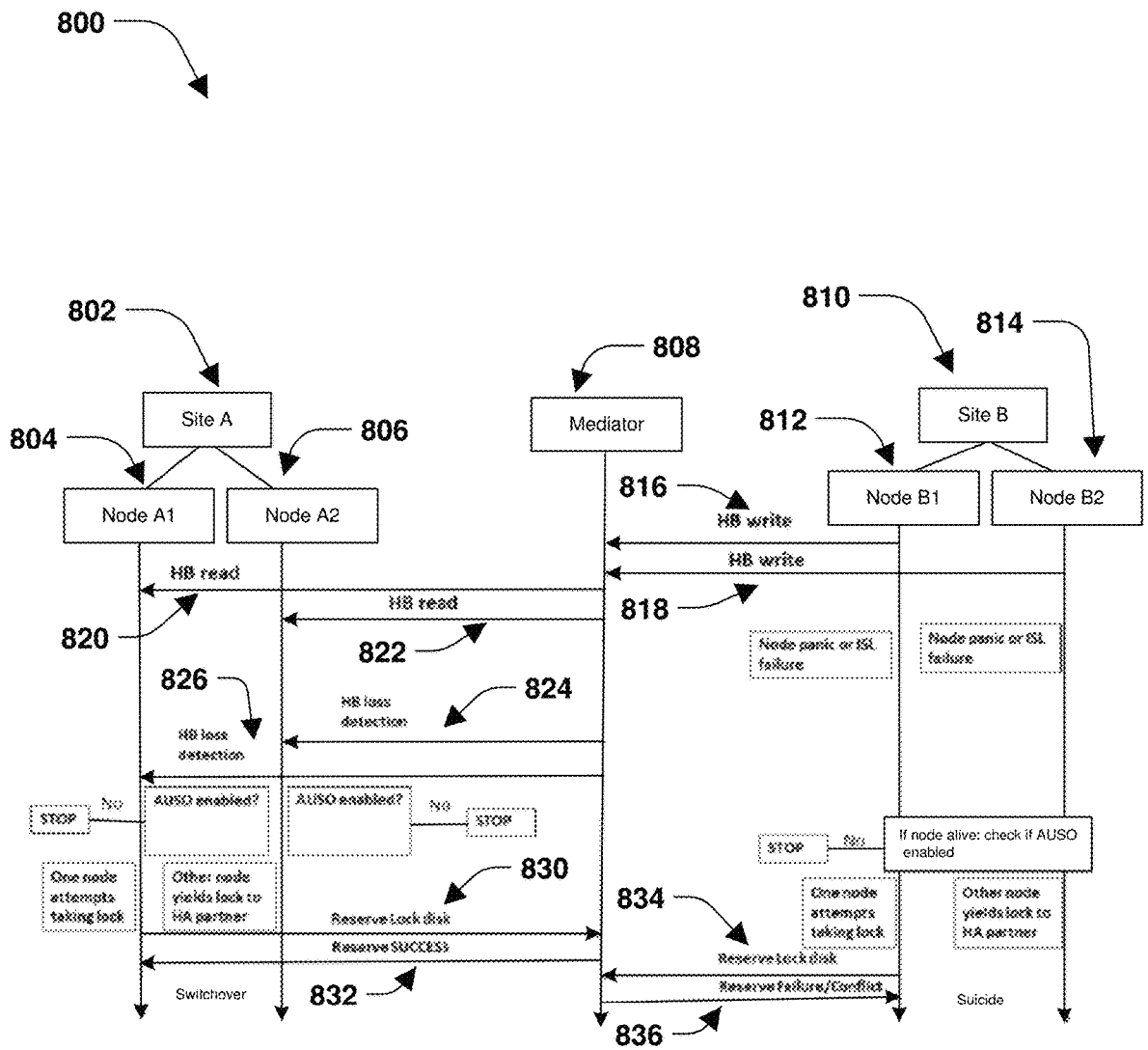
FIG. 8 is a flow chart illustrating an example of a switchover between clusters in a second mode of operation.

In an embodiment, the metadata may comprise switchover information. In an example, the switchover information may specify whether automated switchover is available (enabled) to perform. In an example, the switchover information may indicate whether a mediator node 502, hosting mediator mailbox storage devices owned by the node (A1) 514, the node (A2) 520, the node (B1) 528, and/or the node (B2) 534, is accessible/operational. In an example, the switchover information may indicate whether non-volatile random access memory (NVRAM) synchronization is in-sync. That is, each node may comprise a non-volatile random access memory (NVRAM) into which operations and/or data being written by operations is logged before being stored (flushed) to storage, such as part of a consistency point where operations logged within an NVLog of the NVRAM are performed upon storage. The operations and/or data within the NVRAM may be mirrored/synchronized between nodes so that each node has a copy of the contents within the NVRAM of other nodes. In one embodiment, prior to performing AUSO, the configuration of the storage solution may be evaluated. The configuration may indicate a user's preference in terms of trading off availability of the storage solution against the potential for incurring data loss. The user may configure the storage solution to operate in a non-zero RPO mode to indicate they would rather maintain availability of the storage solution in a disaster recovery situation than be assured of avoiding data loss. Alternatively, the user may configure the storage solution to operate in a zero RPO mode to indicate they would rather avoid any potential for data loss than maintain access to the storage solution in a disaster recovery situation. In either mode, when a switchover is performed, a surviving node may replay content (e.g., operations logged within an NVLog) associated with a failed disaster recovery partner node (e.g., replay NVRAM content that was mirrored from an NVRAM of the failed disaster recovery partner node to the surviving node). As illustrated by FIG. 7, in the zero RPO mode, a determination may first be made that NVRAM is in-sync before proceeding with the switchover so that up-to-date client data is stored into storage used by the surviving node to subsequently process client I/O operations in place of the failed disaster recovery partner node. In contrast, in the non-zero RPO mode, the switchover may proceed regardless of whether the NVRAM is in-sync as illustrated by FIG. 8.

The nodes may store metadata within various mailbox storage devices. For example, the node (A1) 514 may store the metadata within an integer number N set of local mailbox storage devices (A1) 516 (e.g., 1, 2, 3, 4, or any number of local mailbox storage devices), which may be owned by the node (A1) 514 and hosted at the cluster (A) 512. The node (A1) 514 may store the metadata within an integer number N set of remote mailbox storage devices (A1) 532 (e.g., 1, 2, 3, 4, or any number of remote mailbox storage devices), which may be owned by the node (A1) 514 and hosted at the cluster (B) 526. The node (A1) 514 may store the metadata within an integer number N set of mediator mailbox storage devices (A1) 504 (e.g., 1, 2, 3, 4, or any number of mediator mailbox storage devices), which may be owned by the node (A1) 514 and hosted at by a mediator node 502. Mailbox storage devices owned by the node (A1) 514 may be accessible to other nodes, such as readable by the node (B1) 528 being a disaster recovery partner of the node (A1) 514.

Similarly, the node (A2) 520 may store metadata within an integer number N set of local mailbox storage devices (A2) 522 (e.g., 1, 2, 3, 4, or any number of local mailbox storage devices), which may be owned by the node (A2) 520 and hosted at the cluster (A) 512. The node (A2) 520 may store the metadata within an integer number N set of remote mailbox storage devices (A2) 538 (e.g., 1, 2, 3, 4, or any number of remote mailbox storage devices), which may be owned by the node (A2) 520 and hosted at the cluster (B) 526. The node (A2) 520 may store the metadata within an integer number N set of mediator mailbox storage devices (A2) 506 (e.g., 1, 2, 3, 4, or any number of mediator mailbox storage devices), which may be owned by the node (A2) 520 and hosted at by the mediator node 502. Mailbox storage devices owned by the node (A2) 520 may be accessible to other nodes, such as readable by the node (B2) 534 being a disaster recovery partner of the node (A2) 520.

The node (B1) 528 may store metadata within an integer number N set of local mailbox storage devices (B1) 530 (e.g., 1, 2, 3, 4, or any number of local mailbox storage devices), which may be owned by the node (B1) 528 and hosted at the cluster (B) 526. The node (B1) 528 may store the metadata within an integer number N set of remote mailbox storage devices (B1) 518 (e.g., 1, 2, 3, 4, or any number of remote mailbox storage devices), which may be owned by the node (B1) 528 and hosted at the cluster (A) 512. The node (B1) 528 may store the metadata within an integer number N set of mediator mailbox storage devices (B1) 508 (e.g., 1, 2, 3, 4, or any number of mediator mailbox storage devices), which may be owned by the node (B1) 528 and hosted at by the mediator node 502. Mailbox storage devices owned by the node (B1) 528 may be accessible to other nodes, such as readable by the node (A1) 514 being a disaster recovery partner of the node (B1) 528.

The node (B2) 534 may store metadata within an integer number N set of local mailbox storage devices (B2) 536 (e.g., 1, 2, 3, 4, or any number of local mailbox storage devices), which may be owned by the node (B2) 534 and hosted at the cluster (B) 526. The node (B2) 534 may store the metadata within an integer number N set of remote mailbox storage devices (B2) 524 (e.g., 1, 2, 3, 4, or any number of remote mailbox storage devices), which may be owned by the node (B2) 534 and hosted at the cluster (A) 512. The node (B2) 53 may store the metadata within an integer number N set of mediator mailbox storage devices (B2) 510 (e.g., 1, 2, 3, 4, or any number of mediator mailbox storage devices), which may be owned by the node (B2) 534 and hosted at by the mediator node 502. Mailbox storage devices owned by the node (B2) 534 may be accessible to other nodes, such as readable by the node (A2) 520 being a disaster recovery partner of the node (B2) 534.

When a node performs an operation associated with metadata, such as a read operation to read metadata from a mailbox storage device or a write operation to write metadata to a mailbox storage device, quorum voting may be implemented to determine whether the operation is successful, should be considered failed, or whether any additional actions should be performed. For example, the node (A1) 514 may determine that an operation associated with metadata is to be performed (e.g., metadata is to be written to mailbox storage devices owned by the node (A1) 514 such as to update heartbeat and switchover information from a perspective of the node (A1) 514).

Accordingly, during operation 402 of method 400 of FIG. 4, an initial quorum vote is performed before execution of the operation by the node (A1) 514. The initial quorum vote may correspond to a first local vote derived from whether the set of local mailbox storage devices (A1) 516 are operational (accessible to the node (A1) 514 for performing the operation). In an embodiment, the first local vote may be determined as a first value such as 1 or some other value based upon at least one local mailbox storage device of the set of local mailbox storage devices (A1) 516 being operational, otherwise, the first local vote may be determined as a second value such as 0 or some other value. The initial quorum vote may correspond to a first remote vote derived from whether the set of remote mailbox storage devices (A1) 532 are operational (accessible to the node (A1) 514 for performing the operation). In an embodiment, the first remote vote may be determined as a first value such as 1 or some other value based upon at least one remote mailbox storage device of the set of remote mailbox storage devices (A1) 532 being operational, otherwise, the first remote vote may be determined as a second value such as 0 or some other value. The initial quorum vote may correspond to a first mediator vote derived from whether the set of mediator mailbox storage devices (A1) 504 are operational (accessible to the node (A1) 514 for performing the operation). In an embodiment, the first mediator vote may be determined as a first value such as 1 or some other value based upon at least one mediator mailbox storage device of the set of mediator mailbox storage devices (A1) 504 being operational (e.g., if there is only a single mediator mailbox storage device within the set of mediator mailbox storage devices (A1) 504 and that single mediator mailbox storage device is operational, then the first value is determined), otherwise, the first mediator vote may be determined as a second value such as 0 or some other value. In this way, the initial quorum vote may be derived from the first local vote, the first remote vote, and/or the first mediator vote.

During operation 404 of method 400 of FIG. 4, the node (A1) 514 may execute the operation that is associated with the metadata, specifying operational state information of a node (e.g., to write heartbeat information of the node (A1) 514 into a mailbox storage device), and/or switchover information (e.g., whether automated switchover should be enabled or disabled; whether NVRAM synchronization is in-sync or out-of-sync; whether the mediator node 502 is operational; etc.). In an example, the node (A1) 514 may execute the operation to write the metadata to one or more mailbox storage devices (e.g., a mailbox storage device owned by the node (A1) 514, owned by or accessible to the node (A2) 520 as a local HA partner, owned by or accessible to the node (B1) 528 as a disaster recovery partner, etc.). In an example, the node (A1) 514 may read metadata from one or more mailbox storage devices (e.g., a mailbox storage device owned by the node (A1) 514, owned by the node (A2) 520 as a local HA partner, owned by the node (B1) 528 as a disaster recovery partner, etc.). The operation may be executed during normal operation of the cluster (A) 512 and the cluster (B) 526 or during a switchover scenario where one of the clusters has failed and a surviving cluster as has implemented a switchover to take over for the failed cluster. In an example, the metadata may be written to the set of local mailbox storage devices (A1) 516, the set of remote mailbox storage devices (A1) 532, and/or the set of mediator mailbox storage devices (A1) 504.

During operation 406 of FIG. 4, a final quorum vote is performed after execution of the operation by the node (A1) 514. The final quorum vote may correspond to a second local vote derived from whether the set of local mailbox storage devices (A1) 516 are operational (e.g., whether the node (A1) 514 successfully performed the operation upon a local mailbox storage device). In an embodiment, the second local vote may be determined as a first value such as 1 or some other value based upon at least one local mailbox storage device of the set of local mailbox storage devices (A1) 516 being operational, otherwise, the second local vote may be determined as a second value such as 0 or some other value. The final quorum vote may correspond to a second remote vote derived from whether the set of remote mailbox storage devices (A1) 532 are operational (e.g., whether the node (A1) 514 successfully performed the operation upon a remote mailbox storage device). In an embodiment, the second remote vote may be determined as a first value such as 1 or some other value based upon at least one remote mailbox storage device of the set of remote mailbox storage devices (A1) 532 being operational, otherwise, the second remote vote may be determined as a second value such as 0 or some other value. The final quorum vote may correspond to a second mediator vote derived from whether the set of mediator mailbox storage devices (A1) 504 are operational (e.g., whether the node (A1) 514 successfully performed the operation upon a mediator mailbox storage device). In an embodiment, the second mediator vote may be determined as a first value such as 1 or some other value based upon at least one mediator mailbox storage device of the set of mediator mailbox storage devices (A1) 504 being operational, otherwise, the second mediator vote may be determined as a second value such as 0 or some other value. In this way, the initial quorum vote may be derived from the second local vote, the second remote vote, and/or the second mediator vote.

During operation 408 of method 400 of FIG. 4, the operation may be designated as either being successful or failed based upon the initial quorum vote and/or the final quorum vote. For example, the final quorum vote (a final vote count) may be compared with the initial quorum vote (an initial vote count) to determine whether to designate the operation as successful or failed. The comparison may be dependent upon whether the operation was a read operation or a write operation and/or whether the cluster (A) 512 and the cluster (B) 526 are operating under normal circumstances or operating under a switchover scenario where one cluster failed and the surviving cluster takes over for the failed cluster, which is further discussed with respect to FIG. 6.

In an embodiment, the final quorum vote (the final vote count) may be compared with the initial quorum vote (the initial vote count) to determine whether an action is to be performed, such as whether the node (A1) 514 should halt operation, whether automated switchover (AUSO) should be disabled or enabled, whether a mailbox storage device should be removed from a set of mailbox storage devices, whether automated switchover (AUSO) should be initiated, etc. In an example, the node (A1) 514 may determine that a switchover operation is to be performed, such as where switchover information of the metadata read from one or more mailbox storage devices indicates that automated switchover is enabled/possible and/or operational state information indicates that the node (B1) 528, the node (B2) 534, and/or the cluster (B) 526 have failed. Accordingly, the node (A1) 514 and/or the node (A2) 520 may initiate automated switchover.

As part of automated switchover, the node (A1) 514 and/or the node (A2) 520 may obtain a reservation on one or more mediator mailbox storage devices hosted by the mediator node 502. If the reservation is acquired, then the reservation blocks the node (B1) 528 and the node (B2) 534 from performing a switchover operation. For example, the node (B1) 528 and the node (B2) 534 may actually be operational (e.g., actively servicing client I/O operations) and the node (A1) 514 may erroneously assume that the cluster (B) 526 failed, but in actuality a communication failure occurred between the cluster (A) 512 and the cluster (B) 526. If a node determines that another node from a different cluster has an existing reservation on a mediator mailbox storage device, then the node may terminate operation. This ensures that the clusters do not erroneously perform switchover operations or both attempt to perform switchover operations, and thus merely a single cluster may perform a switchover operation and actively serve client I/O. In an embodiment, automated switchover may be performed while the failed cluster is operating in a degraded state where a local partner node at a cluster had taken over for a failed node at the cluster before failure of the cluster.

Example Actions Corresponding to Various Quorum Voting Scenarios

FIG. 6 illustrates various actions 600 that may be performed based upon quorum voting for certain types of operations executing during a normal operating state of the clusters and/or during a switchover operating state of the clusters. It may be appreciated that in some embodiments, the mailboxes referred to by the operations 602-618 refer to mailboxes owned by a node performing the operations 602-618, and that the mailboxes may be located anywhere, such as at a local cluster, a remote cluster, a mediator, etc. An initial quorum vote (N) may be determined before an operation is executed, and may be a function of a first local vote (e.g., 1 if at least one local mailbox storage device is operational, else 0), a first remote vote (e.g., 1 if at least one remote mailbox storage device is operational, else 0), and a first mediator vote (e.g., 1 if a mediator mailbox storage device is operational, else 0). A final quorum vote (F) may be determined after the operation is executed, and may be a function of a second local vote (e.g., 1 if at least one local mailbox storage device is operational such as where the operation successfully executed upon the local mailbox storage device, else 0), a second remote vote (e.g., 1 if at least one remote mailbox storage device is operational such as where the operation successfully executed upon the remote mailbox storage device, else 0), and a second mediator vote (e.g., 1 if a mediator mailbox storage device is operational such as where the operation successfully executed upon the mediator mailbox storage device, else 0). Accordingly, the type of operation (Event), the operating state of the clusters (State), the initial quorum vote (N), and the final quorum vote (F) may be taken into account in order to determine what actions to perform.

In an embodiment, a first operation 602 corresponding a write operation to local owned mailbox storage devices owned by a node may be implemented by the node while the clusters are in a normal operating state (e.g., the set of local mailboxes (A1) 516, the mediator mailbox (A1) 504, and/or the set of remote mailboxes (A1) 532). An initial quorum vote (N) is determined before the first operation 602 is executed. The first operation 602 is then executed to write to the local mailbox storage device. After execution of the first operation 602, a final quorum vote (F) is determined.

If the final quorum vote (F) is 0, then the node (A1) 514 panics. If the final quorum vote (F) is equal to half the initial quorum vote (N), then additional considerations are taken into account. For example, if the initial quorum vote (N) is 3 and automated switchover (AUSO) is disabled (e.g., if a node is alive, but is isolated and has lost connectivity to the mediator node 502 and the disaster recovery partner cluster, then automated switchover may be disabled through a high availability partner node, otherwise, automated switchover may unexpectedly occur if the node goes down), then the node (A1) 514 stays online and operational, otherwise, the node (A1) 514 halts. If the initial quorum vote (N) is 2 and automated switchover is not possible, then the node (A1) 514 stays online and operational. If the mediator vote is 0, then automated switchover (AUSO) is disabled. Any failed disks are removed from the mailbox set (e.g., any failed local mailbox storage devices are removed from the set of local mailbox storage devices (A1) 516). If the node (A1) 514 losses both local and remote mailboxes in a manner that affects root access (e.g., unable to access a root of a file system within storage), then the node (A1) 514 may independently panic.

If the final quorum vote (F) is greater than half the initial quorum vote (N), then the first operation 602 is determined to be successful. Any failed disks are removed from the mailbox set (e.g., any failed local mailbox storage devices are removed from the set of local mailbox storage devices (A1) 516). If the mediator vote is 0, then automated switchover (AUSO) is disabled.

If the final quorum vote (F) is equal to the initial quorum vote (N), then the first operation 602 is determined to be successful. Any failed disks are removed from the mailbox set (e.g., any failed local mailbox storage devices are removed from the set of local mailbox storage devices (A1) 516).

In an embodiment, a second operation 604 corresponding a read operation to one or more local owned mailbox storage devices owned by a node may be implemented by the node while the clusters are in a normal operating state (e.g., the set of local mailboxes (A1) 516, the mediator mailbox (A1) 504, and/or the set of remote mailboxes (A1) 532). An initial quorum vote (N) is determined before the second operation 604 is executed. The second operation 604 is then executed to read from the local mailbox storage device. After execution of the second operation 604, a final quorum vote (F) is determined.

If the final quorum vote (F) is 0, then the node (A1) 514 fails the second operation 604. If the final quorum vote (F) is equal to half the initial quorum vote (N), then the second operation 604 may be deemed to be successful or failed based upon whether hints match. If the final quorum vote (F) is greater than half the initial quorum vote (N), then the second operation 604 is determined to be successful. If the final quorum vote (F) is equal to the initial quorum vote (N), then the second operation 604 is determined to be successful.

In an embodiment, a third operation 606 corresponding a read operation to one or more partner mailbox storage devices may be implemented by the node while the clusters are in a normal operating state. An initial quorum vote (N) is determined before the third operation 606 is executed. The third operation 606 is then executed by node (A1) 514 to read from the partner mailbox storage device owned by the node (A2) 520 that is the partner node of the node (A1) 514. After execution of the third operation 606, a final quorum vote (F) is determined.

If the final quorum vote (F) is 0, then the node (A1) 514 fails the third operation 606. If the final quorum vote (F) is equal to half the initial quorum vote (N), then the node (A1) 514 fails the third operation 606. If the final quorum vote (F) is greater than half the initial quorum vote (N), then the node (A1) 514 fails the third operation 606. If the final quorum vote (F) is equal to the initial quorum vote (N), then the third operation 606 is determined to be successful if there are no mailbox storage device I/O failures on local and remote mailbox storage devices, else, the third operation 606 is failed.

In an embodiment, a fourth operation 608 corresponding a write operation to one or more partner mailbox storage devices may be implemented by the node while the clusters are in a normal operating state. An initial quorum vote (N) is determined before the fourth operation 608 is executed. The fourth operation 608 is then executed by node (A1) 514 to write to the partner mailbox storage device of the node (A2) 520 that is the partner node of the node (A1) 514. After execution of the fourth operation 608, a final quorum vote (F) is determined.

If the final quorum vote (F) is 0, then the node (A1) 514 panics. If the final quorum vote (F) is equal to half the initial quorum vote (N), then additional considerations are taken into account. For example, if the initial quorum vote (N) is 3 and automated switchover (AUSO) is disabled (e.g., if one node is alive, but is isolated and has lost connectivity to the mediator node 502 and the disaster recovery partner cluster, then automated switchover (AUSO) may be disabled through a high availability partner node, otherwise, automated switchover may unexpectedly occur if the node goes down), then the node (A1) 514 stays online and operational (e.g., for a partner mailbox storage device write failure, a halt of a node may be avoided until a local mailbox storage devices also observes a failure, and also, if the partner mailbox storage device write is a seize procedure, then the write is failed). If the initial quorum vote (N) is 2 and automated switchover is not possible, then the node (A1) 514 stays online and operational. If the mediator vote is 0, then automated switchover (AUSO) is disabled.

If the final quorum vote (F) is greater than half the initial quorum vote (N), then the node (A1) 514 determines that the fourth operation 608 succeeded. If the mediator vote is 0, then automated switchover (AUSO) is disabled. If the final quorum vote (F) is equal to the initial quorum vote (N), then the fourth operation 608 is determined to be successful.

In an embodiment, a fifth operation 610 corresponding a read operation to one or more disaster recovery partner mailbox storage devices may be implemented by the node while the clusters are in a normal operating state. An initial quorum vote (N) is determined before the fifth operation 610 is executed. The fifth operation 610 is then executed by node (A1) 514 to read from the remote mailbox storage device of the node (B1) 518 that is the disaster recovery partner node of the node (A1) 514. After execution of the fifth operation 610, a final quorum vote (F), is determined. If the final quorum vote (F) is 0, then the node (A1) 514 fails the fifth operation 610. If the final quorum vote (F) is equal to half the initial quorum vote (N), then the node (A1) 514 fails the fifth operation 610. If the final quorum vote (F) is greater than half the initial quorum vote (N), then the node (A1) 514 determines that the fifth operation 610 was successful. If the final quorum vote (F) is equal to the initial quorum vote (N), then the node (A1) 514 determines that the fifth operation 610 was successful.

In an embodiment, a sixth operation 612 corresponding a write operation to one or more local owned mailbox storage devices may be implemented by the node while the clusters are in a switchover state (e.g., the cluster (A) 512 has taken over for the cluster (B) 526, such as based upon the cluster (B) 526 failing or appearing to have failed to the cluster (A) 512). For example, the node (A1) 514 is writing to one of the local mailbox storage devices of the set of local mailbox storage devices (A1) 516 at the cluster (A) 512. An initial quorum vote (N) is determined before sixth operation 612 is executed. The sixth operation 612 is then executed to write to the local mailbox storage device. After execution of the sixth operation 612, a final quorum vote (F) is determined.

If the final quorum vote (F) is 0, then the node (A1) 514 panics. If the final quorum vote (F) is equal to half the initial quorum vote (N), then the sixth operation 612 is determined as successful. Any failed disks are removed from the mailbox set (e.g., any failed local mailbox storage devices are removed from the set of local mailbox storage devices (A1) 516). If the final quorum vote (F) is greater than half the initial quorum vote (N), then the sixth operation 612 is determined as successful. Any failed disks are removed from the mailbox set (e.g., any failed local mailbox storage devices are removed from the set of local mailbox storage devices (A1) 516). If the final quorum vote (F) is equal to the initial quorum vote (N), then the sixth operation 612 is determined as successful. Any failed disks are removed from the mailbox set (e.g., any failed local mailbox storage devices are removed from the set of local mailbox storage devices (A1) 516).

In an embodiment, a seventh operation 614 corresponding a read operation associated with one or more local owned mailbox storage devices may be implemented by the node while the clusters are in a switchover state (e.g., the cluster (A) 512 has taken over for the cluster (B) 526, such as based upon the cluster (B) 526 failing or appearing to have failed to the cluster (A) 512). For example, the node (A1) 514 reading from one of the local mailbox storage devices of the set of local mailbox storage devices 516 at the cluster (A) 512. An initial quorum vote (N) is determined before the seventh operation 614 is executed. The seventh operation 614 is then executed to read from the local mailbox storage device. After execution of the seventh operation 614, a final quorum vote (F) is determined.

If the final quorum vote (F) is 0, then the node (A1) 514 fails the seventh operation 614. If the final quorum vote (F) is equal to half the initial quorum vote (N), then the second operation 604 may be deemed to be successful or failed based upon whether hints match. If the final quorum vote (F) is greater than half the initial quorum vote (N), then the seventh operation 614 is determined to be successful. If the final quorum vote (F) is equal to the initial quorum vote (N), then the seventh operation 614 is determined to be successful.

In an embodiment, an eighth operation 616 corresponding a read operation to one or more partner mailbox storage devices may be implemented by the node while the clusters are in a switchover state (e.g., the cluster (A) 512 has taken over for the cluster (B) 526, such as based upon the cluster (B) 526 failing or appearing to have failed to the cluster (A) 512). For example, the node (A1) 514 is reading from one of the local mailbox storage devices of the set of local mailbox storage devices (A2) 522 at the cluster (A) 512 and owned by the node (A2) 520 that is the partner node of the node (A1) 514. An initial quorum vote (N) is determined before the eighth operation 616 is executed. The eighth operation 616 is then executed by node (A1) 514 to read from the local mailbox storage device of the node (A2) 520 that is the partner node of the node (A1) 514. After execution of the eighth operation 616, a final quorum vote (F) is determined.

If the final quorum vote (F) is 0, then the node (A1) 514 fails the eighth operation 616. If the final quorum vote (F) is equal to half the initial quorum vote (N), then the node (A1) 514 fails the eighth operation 616. If the final quorum vote (F) is greater than half the initial quorum vote (N), then the node (A1) 514 fails the eighth operation 616. If the final quorum vote (F) is equal to the initial quorum vote (N), then the eighth operation 616 is determined to be successful if there are no mailbox storage device I/O failures on local and remote mailbox storage devices, else, the eighth operation 616 is failed.

In an embodiment, a ninth operation 618 corresponding a read operation to one or more disaster recovery partner mailbox storage devices may be implemented by the node while the clusters are in a switchover state (e.g., the cluster (A) 512 has taken over for the cluster (B) 526, such as based upon the cluster (B) 526 failing or appearing to have failed to the cluster (A) 512). For example, the node (A1) 514 is reading from one of the remote mailbox storage devices of the set of remote mailbox storage devices (B1) 518 at the cluster (A) 512 and owned by the node (B1) 528 that is the disaster recovery partner node of the node (A1) 514. An initial quorum vote (N) is determined before the ninth operation 618 is executed. The ninth operation 618 is then executed by node (A1) 514 to read from the remote mailbox storage device of the node (B1) 518 that is the disaster recovery partner node of the node (A1) 514. After execution of the ninth operation 618, a final quorum vote (F), is determined. If the final quorum vote (F) is 0, then the node (A1) 514 fails the ninth operation 618. If the final quorum vote (F) is equal to half the initial quorum vote (N), then the node (A1) 514 fails the ninth operation 618. If the final quorum vote (F) is greater than half the initial quorum vote (N), then the node (A1) 514 determines that the ninth operation 618 was successful. If the final quorum vote (F) is equal to the initial quorum vote (N), then the node (A1) 514 determines that the ninth operation 618 was successful.

Example of a Storage Solution Operating in a Zero RPO Mode

FIG. 7 illustrates an example 700 of a workflow for performing a switchover operation, such as an automated switchover (AUSO) operation, when a storage solution is configured for operation in accordance with a zero RPO mode. In an embodiment, a site (A) 702 (a cluster (A)) hosts a node (A1) 704 and a node (A2) 706. The node (A1) 704 may be paired with the node (A2) 706 according to a high availability pairing (local partner nodes) such that if one node fails, then the surviving node can quickly perform a takeover for the failed node in order to process client I/O operations to client data previously accessed by client devices through the failed node. A site (B) 710 (a cluster (B)) hosts a node (B1) 712 and a node (B2) 714. The node (B1) 712 may be paired with the node (B2) 714 according to the high availability pairing (local partner nodes) such that if one node fails, then the surviving node can quickly perform a takeover for the failed node in order to process client I/O operations to client data previously accessed by client devices through the failed node. A disaster recovery relationship may be maintained between the site (A) 702 and the site (B) 710 such that if one cluster fails, then the surviving cluster can perform a switchover operation in order to take over for the failed cluster for providing client devices with access to client data previously accessible to the client devices through the failed cluster. For example, node (A1) 704 and node (B1) 712 may be disaster recovery partners, and node (A2) 706 and node (B2) 714 may be disaster recovery partners. In order to enable switchover functionality, such as automated switchover functionality, metadata may be shared amongst the nodes so that the nodes have up-to-date operational state information of nodes and switchover information indicating whether automated switchover is enabled, possible, or disabled.

Each node may own a set of local mailbox storage devices at the cluster where the node is located. For example, the node (A1) 704 may own N (3 or any other number) local mailbox storage devices at the site (A) 702 where the node (A1) 704 is located. Each node may own a set of remote mailbox storage devices at the cluster where the node is not located. For example, the node (A1) 704 may own N (3 or any other number) remote mailbox storage devices at the site (B) 710. Each node may own N (1 or any other number) mediator mailbox storage devices at a mediator node 708. For example, the node (A1) 704 may own a mediator mailbox storage device at the mediator node 708. In an example, the node (A1) 704, the node (A2) 706, the node (B1) 712, and the node (B2) 714 will each own a set of local mailbox storage devices, a set of remote mailbox storage devices, and a mediator mailbox storage device.

In an embodiment, the node (B1) 712 may perform a write operation 716 to write operational state information (a heartbeat (HB)) into a mediator mailbox storage device at the mediator node 708. The node (B2) 714 may perform a write operation 718 to write operational state information (a heartbeat (HB)) into a mediator mailbox storage device at the mediator node 708. The node (A1) 704 may performed a read operation 720 to read the operational state information written to the mediator mailbox storage device of the mediator node 708 by the node (B1) 712. The node (A2) 706 may performed a read operation 722 to read the operational state information written to the mediator mailbox storage device of the mediator node 708 by the node (B2) 714. The node (A2) 706 may detect a heartbeat loss 724 associated with the node (B2) 714, such as where the node (B2) 714 panics or there is a communication failure (e.g., an inter-switch link (ISL) failure). The node (A1) 704 may detect a heartbeat loss 726 associated with the node (B1) 712, such as where the node (B1) 712 panics or there is a communication failure (e.g., an inter-switch link (ISL) failure).

If the node (A1) 704 determines that automated switchover (AUSO) is disabled or not possible, then the node (A1) 704 does not implement automated switchover (stops). If the node (A1) 704 determines that NVRAM synchronization is out-of-sync, then the node (A1) 704 does not implement automated switchover (AUSO) (stops). Similarly, if the node (A2) 706 determines that automated switchover (AUSO) is disabled or not possible, then the node (A2) 706 does not implement automated switchover (AUSO) (stops). If the node (A2) 706 determines that NVRAM synchronization is out-of-sync, then the node (A2) 706 does not implement automated switchover (AUSO) (stops).

If automated switchover is enabled and NVRAM is in-sync, then the node (A1) 704 or the node (A2) 706 attempts to take a reservation on one or more mediator mailbox storage devices at the mediator node 708 by performing a reserve lock disk operation 730, and the partner node yields the lock to the node obtaining the reservation (e.g., the node (A1) 704 attempts to obtain the reservation while the node (A2) 706 yields to the node (A1) 704 and does not attempt to also obtain the reservation). If the reservation is a success 732, then site (A) 702 performs the automated switchover (AUSO) and starts operating in a switchover mode to process client I/O operations in place of the site (B) 710.

In an embodiment, while the site (A) 702 is attempting to perform the automated switchover, the site (B) 710 may actually be operational, and merely a communication failure has caused the node (A1) 704 and the node (A2) 706 to detect the heartbeat loss of the node (B1) 712 and the node (B2) 714 that are still operational and/or actively processing client I/O operations. Accordingly, If the node (B1) 712 determines that automated switchover (AUSO) is disabled or not possible, then the node (B1) 712 does not implement automated switchover (AUSO) (stops). If the node (B1) 712 determines that NVRAM synchronization is out-of-sync, then the node (B1) 712 does not implement automated switchover (AUSO) (stops). Similarly, if the node (B2) 714 determines that automated switchover (AUSO) is disabled or not possible, then the node (B2) 714 does not implement automated switchover (AUSO) (stops). If the node (B2) 714 determines that NVRAM synchronization is out-of-sync, then the node (B2) 714 does not implement automated switchover (AUSO) (stops).

If automated switchover (AUSO) is enabled and NVRAM is in-sync, then the node (B1) 712 or the node (B2) 714 attempts to take a reservation on one or more mediator mailbox storage devices at the mediator node 708 by performing a reserve lock disk operation 734, and the partner node yields the lock to the node obtaining the reservation. If the reservation fails 736 (a conflict because a node of site (A) 702 already obtained a reservation, such as the node (A1) 704 that performed the reserve lock disk operation 730), then the node (B1) 712 and the node (B2) 714 terminate operation (commit suicide).

Example of a Storage Solution Operating in a Non-Zero RPO Mode

FIG. 8 illustrates an example 800 of a workflow for performing a switchover operation, such as an automated switchover (AUSO) operation, when a storage solution is configured for operation in accordance with a non-zero RPO mode. In an embodiment, a site (A) 802 (a cluster (A)) hosts a node (A1) 804 and a node (A2) 806. The node (A1) 804 may be paired with the node (A2) 806 according to a high availability pairing (local partner nodes) such that if one node fails, then the surviving node can quickly perform a takeover for the failed node in order to process client I/O operations to client data previously accessed by client devices through the failed node. A site (B) 810 (a cluster (B)) hosts a node (B1) 812 and a node (B2) 814. The node (B1) 812 may be paired with the node (B2) 814 according to the high availability pairing (local partner nodes) such that if one node fails, then the surviving node can quickly perform a takeover for the failed node in order to process client I/O operations to client data previously accessed by client devices through the failed node. A disaster recovery relationship may be maintained between the site (A) 802 and the site (B) 810 such that if one cluster fails, then the surviving cluster can perform a switchover operation in order to take over for the failed cluster for providing client devices with access to client data previously accessible to the client devices through the failed cluster. For example, node (A1) 804 and node (B1) 812 may be disaster recovery partners, and node (A2) 806 and node (B2) 814 may be disaster recovery partners. In order to enable switchover functionality, such as automated switchover functionality, metadata may be shared amongst the nodes so that the nodes have up-to-date operational state information of nodes and switchover information indicating whether automated switchover is enabled, possible, or disabled.

Each node may own a set of local mailbox storage devices at the cluster where the node is located. For example, the node (A1) 804 may own N (3 or any other number) local mailbox storage devices at the site (A) 802 where the node (A1) 804 is located. Each node may own a set of remote mailbox storage devices at the cluster where the node is not located. For example, the node (A1) 804 may own N (3 or any other number) remote mailbox storage devices at the site (B) 810. Each node may own N (1 or any other number) mediator mailbox storage devices at a mediator node 808. For example, the node (A1) 804 may own a mediator mailbox storage device at the mediator node 808. In an example, the node (A1) 804, the node (A2) 806, the node (B1) 812, and the node (B2) 814 will each own a set of local mailbox storage devices, a set of remote mailbox storage devices, and a mediator mailbox storage device.

In an embodiment, the node (B1) 812 may perform a write operation 816 to write operational state information (a heartbeat (HB)) into a mediator mailbox storage device at the mediator node 808. The node (B2) 814 may perform a write operation 818 to write operational state information (a heartbeat (HB)) into a mediator mailbox storage device at the mediator node 808. The node (A1) 804 may performed a read operation 820 to read the operational state information written to the mediator mailbox storage device of the mediator node 808 by the node (B1) 812. The node (A2) 806 may performed a read operation 822 to read the operational state information written to the mediator mailbox storage device of the mediator node 808 by the node (B2) 814. The node (A2) 806 may detect a heartbeat loss 824 associated with the node (B2) 814, such as where the node (B2) 814 panics or there is a communication failure (e.g., an inter-switch link (ISL) failure). The node (A1) 804 may detect a heartbeat loss 826 associated with the node (B1) 812, such as where the node (B1) 812 panics or there is a communication failure (e.g., an inter-switch link (ISL) failure).

If the node (A1) 804 determines that automated switchover (AUSO) is disabled or not possible, then the node (A1) 804 does not implement automated switchover (stops). Similarly, if the node (A2) 806 determines that automated switchover (AUSO) is disabled or not possible, then the node (A2) 806 does not implement automated switchover (AUSO) (stops). In contrast to the example illustrated by FIG. 7, in one embodiment, when the storage solution is operating in non-zero RPO mode, the state of synchronization of NVRAM need not be considered by either node (A1) 804 or node (A2) 806 as this configuration favors maintaining availability of the storage solution over avoidance of data loss. As such, the performance of AUSO may proceed regardless of whether NVRAM is in-sync.

If automated switchover is enabled, then the node (A1) 804 or the node (A2) 806 attempts to take a reservation on one or more mediator mailbox storage devices at the mediator node 808 by performing a reserve lock disk operation 830, and the partner node yields the lock to the node obtaining the reservation (e.g., the node (A1) 804 attempts to obtain the reservation while the node (A2) 806 yields to the node (A1) 804 and does not attempt to also obtain the reservation). If the reservation is a success 832, then site (A) 802 performs the automated switchover (AUSO) and starts operating in a switchover mode to process client I/O operations in place of the site (B) 810.

In an embodiment, while the site (A) 802 is attempting to perform the automated switchover, the site (B) 810 may actually be operational, and merely a communication failure has caused the node (A1) 804 and the node (A2) 806 to detect the heartbeat loss of the node (B1) 812 and the node (B2) 814 that are still operational and/or actively processing client I/O operations. Accordingly, If the node (B1) 812 determines that automated switchover (AUSO) is disabled or not possible, then the node (B1) 812 does not implement automated switchover (AUSO) (stops). Similarly, if the node (B2) 814 determines that automated switchover (AUSO) is disabled or not possible, then the node (B2) 814 does not implement automated switchover (AUSO) (stops). Again, in contrast to the example illustrated by FIG. 7, in one embodiment, when the storage solution is operating in non-zero RPO mode, the state of synchronization of NVRAM need not be considered by either node (B1) 812 or node (B2) 814 as this configuration favors maintaining availability of the storage solution over avoidance of data loss. As such, the performance of AUSO may proceed regardless of whether NVRAM is in-sync.

If automated switchover (AUSO) is enabled, then the node (B1) 812 or the node (B2) 814 attempts to take a reservation on one or more mediator mailbox storage devices at the mediator node 808 by performing a reserve lock disk operation 834, and the partner node yields the lock to the node obtaining the reservation. If the reservation fails 836 (a conflict because a node of site (A) 802 already obtained a reservation, such as the node (A1) 804 that performed the reserve lock disk operation 830), then the node (B1) 812 and the node (B2) 814 terminate operation (commit suicide).

Figure 9:
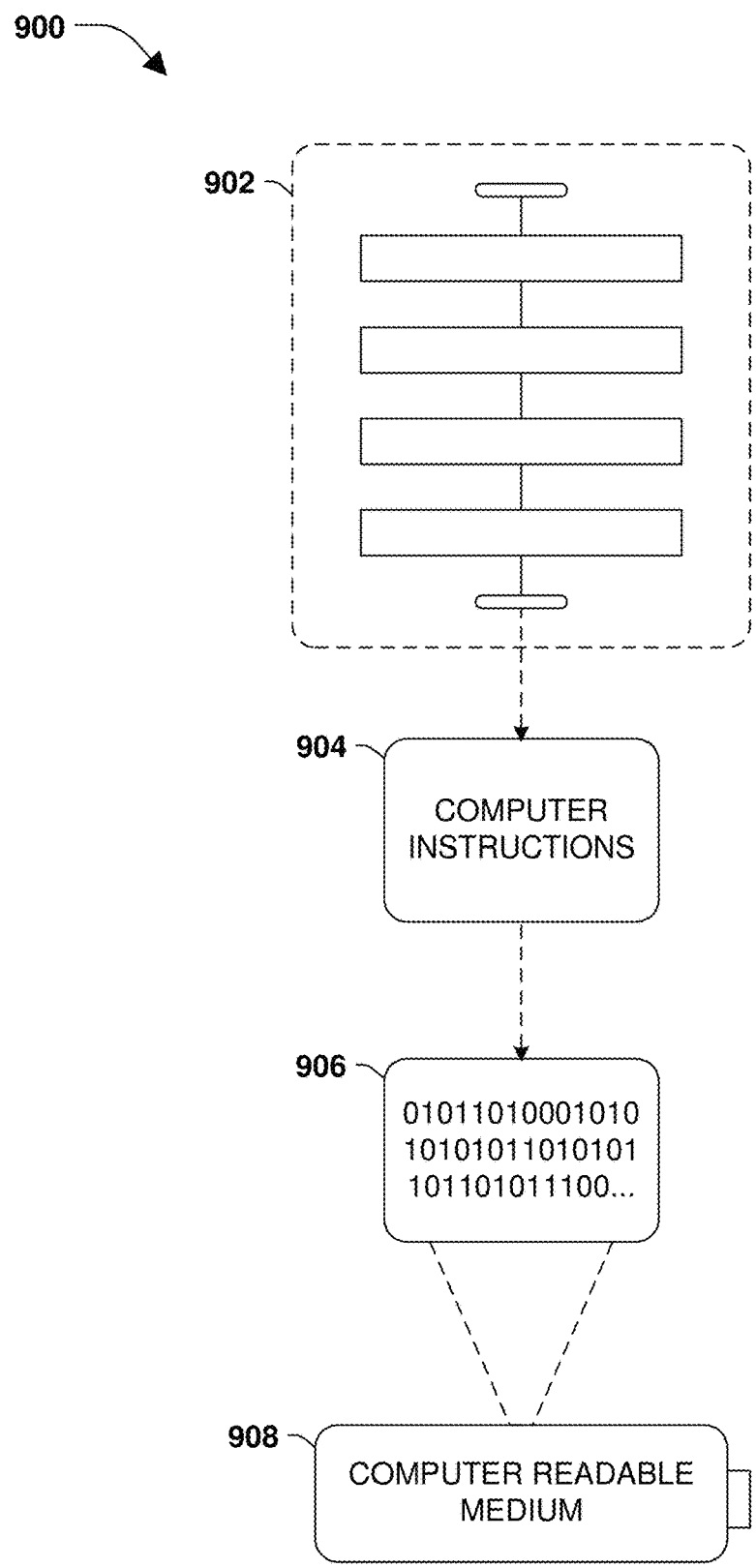
FIG. 9 is an example of a computer readable medium in which an embodiment of the invention may be implemented.

Still another embodiment involves a computer-readable medium 900 comprising processor-executable instructions configured to implement one or more of the techniques presented herein. An example embodiment of a computer-readable medium or a computer-readable device that is devised in these ways is illustrated in FIG. 9, wherein the implementation comprises a computer-readable medium 908, such as a compact disc-recordable (CD-R), a digital versatile disc-recordable (DVD-R), flash drive, a platter of a hard disk drive, etc., on which is encoded computer-readable data 906. This computer-readable data 906, such as binary data comprising at least one of a zero or a one, in turn comprises processor-executable computer instructions 904 configured to operate according to one or more of the principles set forth herein. In some embodiments, the processor-executable computer instructions 904 are configured to perform a method 902, such as at least some of the exemplary method 400 of FIG. 4, for example. In some embodiments, the processor-executable computer instructions 904 are configured to implement a system, such as at least some of the exemplary system 500 of FIG. 5, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
    after detecting, by a first node of a plurality of nodes of a first cluster of a cross-site storage solution including a mediator node, the first cluster operable at a first site, and a second cluster operable at a second site and having a plurality of nodes, a switchover trigger event,
    determining, by the first node, whether performance of an automated switchover from a failed cluster to a surviving cluster of the cross-site storage solution is enabled;
    after said determining being affirmative, further determining, by the first node, a switchover mode in which the cross-site storage solution is configured to operate;
    after the switchover mode is determined to be indicative of a preference to avoid data loss over maintaining availability of the cross-site storage solution, proceeding, by the first node, with the automated switchover if a local operation log maintained by the first node is in a state of synchronization with a remote operation log maintained by the second cluster; and
    after the switchover mode is determined to be indicative of a preference to maintain availability of the cross-site storage solution over avoiding data loss, proceeding, by the first node, with the automated switchover regardless of the state of synchronization between the local operation log and the remote operation log.

2. The method of claim 1, further comprising prior to the switchover event, enabling or disabling, by the first node, the performance of the automated switchover based on success or failure of execution of a write operation to store metadata, specifying operational state information of the first node and switchover information.

3. The method of claim 2, further comprising:
    obtaining, by the first node, results of an initial quorum vote, before execution of the write operation, wherein the initial quorum vote corresponds to at least one of a first local vote derived from whether a set of local mailbox storage devices are operational, a first remote vote derived from whether a set of remote mailbox storage devices are operational, or a first mediator vote derived from whether a mediator mailbox storage device is operational;
    executing, by the first node, the write operation to store the metadata;
    performing, by the first node, a final quorum vote, after execution of the write operation, corresponding to at least one of a second local vote derived from whether the set of local mailbox storage devices are operational, a second remote vote derived from whether the set of remote mailbox storage devices are operational, or a second mediator vote derived from whether the mediator mailbox storage device is operational; and
    designating, by the first node, the write operation as either successful or failed based upon at least one of the initial quorum vote or the final quorum vote.

4. The method of claim 3, wherein the metadata is written to the set of local mailbox storage devices owned by the first node and located at the first cluster, the set of remote mailbox storage devices owned by the first node and located at a second storage cluster, and the mediator storage device owned by the first node and located at the mediator node.

5. The method of claim 3, further comprising determining the first local vote as a first value based upon at least one local mailbox storage device of the set of local mailbox storage devices being operational, otherwise, determining the first local vote as a second value.

6. The method of claim 3, further comprising determining the first remote vote as a first value based upon at least one remote mailbox storage device of the set of remote mailbox storage devices being operational, otherwise, determining the second remote vote as a second value.

7. The method of claim 3, further comprising determining the first mediator vote as a first value based upon the mediator mailbox storage device being operational, otherwise, determining the first mediator vote as a second value.

8. The method of claim 3, further comprising comparing the initial quorum vote to the final quorum vote to determine whether to designate the write operation as successful or failed.

9. The method of claim 3, further comprising responsive to the switchover trigger event, obtaining, by the first node, a reservation on the mediator mailbox storage device to block a node of the plurality of nodes of the second cluster from performing the switchover operation.

10. A non-transitory machine readable medium having stored thereon instructions, which when executed by a first node of a plurality of nodes of a first cluster of a cross-site storage solution including a mediator node, the first cluster operable at a first site, and a second cluster operable at a second site and having a plurality of nodes, cause the first node to:
after detecting a switchover trigger event, determine whether performance of an automated switchover from a failed cluster to a surviving cluster of the cross-site storage solution is enabled;
after an affirmative determination, further determine a switchover mode in which the cross-site storage solution is configured to operate;
after the switchover mode is determined to be indicative of a preference to avoid data loss over maintaining availability of the cross-site storage solution, proceed with the automated switchover if a local operation log maintained by the first node is in a state of synchronization with a remote operation log maintained by the second cluster; and
after the switchover mode is determined to be indicative of a preference to maintain availability of the cross-site storage solution over avoiding data loss, proceed with the automated switchover regardless of the state of synchronization between the local operation log and the remote operation log.

11. The non-transitory machine readable medium of claim 10, wherein the instructions further cause the first node to prior to the switchover event, enable or disable the performance of the automated switchover based on success or failure of execution of a write operation to store metadata, specifying operational state information of the first node and switchover information.

12. The non-transitory machine readable medium of claim 11, wherein the instructions further cause the first node to:
obtain results of an initial quorum vote before execution of the write operation, wherein the initial quorum vote corresponds to at least one of a first local vote derived from whether a set of local mailbox storage devices are operational, a first remote vote derived from whether a set of remote mailbox storage devices are operational, or a first mediator vote derived from whether a mediator mailbox storage device is operational;
execute the write operation to store the metadata;
perform a final quorum vote after execution of the write operation, corresponding to at least one of a second local vote derived from whether the set of local mailbox storage devices are operational, a second remote vote derived from whether the set of remote mailbox storage devices are operational, or a second mediator vote derived from whether the mediator mailbox storage device is operational; and
designate the write operation as either successful or failed based upon at least one of the initial quorum vote or the final quorum vote.

13. The non-transitory machine readable medium of claim 12, wherein the metadata is written to the set of local mailbox storage devices owned by the first node and located at the first cluster, the set of remote mailbox storage devices owned by the first node and located at a second storage cluster, and the mediator storage device owned by the first node and located at the mediator node.

14. The non-transitory machine readable medium of claim 12, wherein the instructions further cause the first node to determine the first local vote as a first value based upon at least one local mailbox storage device of the set of local mailbox storage devices being operational, otherwise, determine the first local vote as a second value.

15. The non-transitory machine readable medium of claim 12, wherein the instructions further cause the first node to determine the first remote vote as a first value based upon at least one remote mailbox storage device of the set of remote mailbox storage devices being operational, otherwise, determine the second remote vote as a second value.

16. The non-transitory machine readable medium of claim 12, wherein the instructions further cause the first node to determine the first mediator vote as a first value based upon the mediator mailbox storage device being operational, otherwise, determining the first mediator vote as a second value.

17. The non-transitory machine readable medium of claim 12, wherein the instructions further cause the first node to compare the initial quorum vote to the final quorum vote to determine whether to designate the write operation as successful or failed.

18. A computer system comprising:
one or more processors; and
a non-transitory computer-readable medium, coupled to the one or more processors, having stored therein instructions that when executed by the one or more processors cause the computer system to:
after detecting a switchover trigger event, determine whether performance of an automated switchover from a failed cluster to a surviving cluster of a cross-site storage solution is enabled, wherein the cross-site storage solution include a mediator node, a first cluster operable at a first site and having a plurality of nodes including the computer system, and a second cluster operable at a second site and having a plurality of nodes;
after an affirmative determination, further determine a switchover mode in which the cross-site storage solution is configured to operate;
after the switchover mode is determined to be indicative of a preference to avoid data loss over maintaining availability of the cross-site storage solution, proceed with the automated switchover if a local operation log maintained by the computer system is in a state of synchronization with a remote operation log maintained by the second cluster; and
after the switchover mode is determined to be indicative of a preference to maintain availability of the cross-site storage solution over avoiding data loss, proceed with the automated switchover regardless of the state of synchronization between the local operation log and the remote operation log.

19. The computer system of claim 18, wherein the instructions further cause the computer system to prior to the switchover event, enable or disable the performance of the automated switchover based on success or failure of execution of a write operation to store metadata, specifying operational state information of the computer system and switchover information.

20. The computer system of claim 19, wherein the instructions further cause the computer system to:
obtain results of an initial quorum vote before execution of the write operation, wherein the initial quorum vote corresponds to at least one of a first local vote derived from whether a set of local mailbox storage devices are operational, a first remote vote derived from whether a set of remote mailbox storage devices are operational, or a first mediator vote derived from whether a mediator mailbox storage device is operational;
execute the write operation to store the metadata;
perform a final quorum vote after execution of the write operation, corresponding to at least one of a second local vote derived from whether the set of local mailbox storage devices are operational, a second remote vote derived from whether the set of remote mailbox storage devices are operational, or a second mediator vote derived from whether the mediator mailbox storage device is operational; and
designate the write operation as either successful or failed based upon at least one of the initial quorum vote or the final quorum vote.

* * * * *